(12) United States Patent
Ganille et al.

(10) Patent No.: US 8,812,865 B2
(45) Date of Patent: Aug. 19, 2014

(54) SECURED CLIENT-SERVER COMPUTER SYSTEM FOR INTERACTIVE APPLICATIONS

(75) Inventors: Thierry Ganille, Merignac (FR); Patrice Capircio, Le Taillan Medoc (FR); Pierre-Jean Turpeau, Pessac (FR)

(73) Assignee: Thales, Neuilly-sur Seine (FR)

( * ) Notice: Subject to any disclaimer, the term of this patent is extended or adjusted under 35 U.S.C. 154(b) by 423 days.

(21) Appl. No.: 13/198,931

(22) Filed: Aug. 5, 2011

(65) Prior Publication Data

US 2012/0036445 A1 Feb. 9, 2012

(30) Foreign Application Priority Data

Aug. 6, 2010 (FR) ...................... 10 03304

(51) Int. Cl.
*G06F 11/30* (2006.01)
*G06F 11/07* (2006.01)
*G06F 9/44* (2006.01)

(52) U.S. Cl.
CPC ........ *G06F 11/0751* (2013.01); *G06F 11/0739* (2013.01); *G06F 9/4443* (2013.01)
USPC ...................................................... 713/187

(58) Field of Classification Search
USPC ...................................................... 713/187
See application file for complete search history.

(56) References Cited

U.S. PATENT DOCUMENTS

| | | | |
|---|---|---|---|
| 2004/0162895 A1* | 8/2004 | Mok et al. | 709/223 |
| 2006/0005207 A1* | 1/2006 | Louch et al. | 719/328 |
| 2006/0010394 A1* | 1/2006 | Chaudhri et al. | 715/779 |
| 2008/0148235 A1 | 6/2008 | Foresti et al. | |
| 2008/0211814 A1* | 9/2008 | Capircio et al. | 345/441 |
| 2009/0243893 A1 | 10/2009 | Filliatre et al. | |
| 2010/0058116 A1 | 3/2010 | Bonnet et al. | |

FOREIGN PATENT DOCUMENTS

FR 2 884 949 A1 10/2006

OTHER PUBLICATIONS

David Navarre, et al., "A Formal Approach for User Interaction Reconfiguration of Safety Critical Interactive System", Computer Safety, Reliability, and Security (Lecture Notes in Computer Science), Sep. 22, 2008, pp. 373-386, Springer Berlin Heidelberg, Berlin, XP019106620.

* cited by examiner

*Primary Examiner* — Teshome Hailu
(74) *Attorney, Agent, or Firm* — Baker & Hostetler LLP

(57) ABSTRACT

A client-server type computer system for graphical applications is provided, that is to say, for displaying data in the form of software units called "widgets" on display screens called "display units", said system being intended to control the operation of a machine, the machine including at least one human-machine interface allowing interaction with the widgets, said system managing critical data or functions. The computer system includes a securing engine controlling the integrity of the display of the critical widgets, the sending of commands which is performed by means of the human-machine interface, the input and display of the critical data. The main provisions of this securing engine are the use of computer "signatures", the provision of "feedback" circuits and the use of guard mechanisms or dedicated confirmation dialog boxes. Preferably, the machine is an aircraft, the computer system is the avionics on board said aircraft and the display screens are the cockpit display systems.

7 Claims, 5 Drawing Sheets

SECURED CLIENT-SERVER COMPUTER SYSTEM FOR INTERACTIVE APPLICATIONS

CROSS-REFERENCE TO RELATED APPLICATION

This application claims priority to foreign French patent application No. FR 1003304, filed on Aug. 6, 2010, the disclosure of which is incorporated by reference in its entirety.

FIELD OF THE INVENTION

The field of the invention is that of secured so-called "client-server" computer systems for interactive applications, and in particular for avionics applications.

BACKGROUND OF THE INVENTION

The "client-server" systems, widely used in the computer networking world, first appeared in cockpit avionics at the beginning of the new millennium. Cockpit avionics should be understood to cover all the electronic and computer means that make it possible to process, to display, to control and to modify the information necessary for the piloting and the navigation of an aircraft and more generally for the accomplishment of the mission of the aircraft during a flight.

The ARINC 661 standard provides a standardized framework for the implementation of these computer architectures in aeronautics. The components of such a system are, primarily:
 a graphical server providing a capacity to plot basic graphical objects from prompts received in the form of requests or commands coming from the crew or from the "clients". This server corresponds to the "cockpit display system". It comprises the display units, human-machine interfaces, the database of the characteristics of the "widgets", or "widget library", and an "ARINC 661" format dialogue protocol. A "widget" is a software unit associated with a graphical representation;
 clients called "user application", or "UA" in the ARINC 661 standard executing the operational functions and sending requests to the server to display the information.

The graphical server offers the capacity to process actions that an operator, in this case the crew, wants to initiate on a client. In a client-server architecture, the operational intelligence is therefore located in the clients. The server simply executes the requests from its clients without having any operational knowledge thereof. Conversely, in the conventional avionics architectures, the operational intelligence is situated in the cockpit equipment elements which therefore control the functional content of what they display.

FIGS. 1 and 2 describe the functional streams of an interactive server on initialization of the system and while the system is being used. An interactive application or client sends, on initialization of the system, in the form of "instantiation" commands, the definition of the interactive pages which are stored on the server in the form of the model of the "widgets". A "widget" should be understood to be a software unit associated with a graphical representation and a behaviour presented on the cockpit display units, also called "DU". The widgets enable the crew, by means of a control medium, to give instructions to the aircraft control system and to receive information. From this model, as can be seen in FIG. 2, graphical commands are generated cyclically and sent to the graphical machine. The model of the widgets can be modified either by the sending of a command from the application under its own initiative, or by the action of a user on the control medium which also generate a response from the application in the form of a command. In FIG. 2, the path taken by the commands from the media is represented by bold-line arrows.

By way of examples, the control media are keyboards, computer "mice", "trackballs", touch screens or dedicated control stations, for example of "KCCU" (keyboard cursor control unit) type. The widgets are conventionally pop-up menus, graphical buttons, numerical input fields, "combo-boxes" and more generally cover all the graphical interaction means.

In aeronautics, there are a certain number of so-called critical functions which have to be able to be managed by a "client-server" system. A critical datum or function should be understood to be a datum or a function whose unexpected modification or untimely activation by a piloted system may result in a catastrophic scenario or an accident for the aircraft. The events to be feared fall into two categories, human errors on the one hand, and malfunctions leading to a problem of non-integrity of the functions or of the data or even an untimely activation on the other hand.

The human errors involve an accidental or untimely action on the part of the operator, for example an accidental click on a widget.

The problem of integrity concerns three types of events:
 an interaction of the user who obtains a good visual feedback, but for which the associated command is not processed or sent without the user being aware of it. It is therefore essential to guarantee that a user request deriving from an action on a graphical element is taken into account and that the associated processing is carried out;
 a user interaction which does not result in any visual feedback, but for which the associated command is processed or sent without the user being aware of it. It is therefore essential to ensure the consistency between a user interaction and the associated visual feedback;
 an unexpected modification of the structure of the model of the widgets or of the attributes of this model.

For dependability, it is necessary to put in place an integrity check for the operational function in the cockpit system. One of the techniques commonly implemented is "feedback" which consists in verifying, by a inverse computation, the consistency of the parameters displayed with the parameters supplied to the system. The mathematical foundation of this mechanism is based on the fact that the composition of a function by its inverse is equal to the identity function (F° F$^{-1}$=identity). Thus, if it is possible to find the inverse function F$^{-1}$ of the display function F of a critical parameter p, it is sufficient to verify that F(F$^{-1}$(p))=p to guarantee that the function F has indeed been executed. From a system point of view, in order to guarantee that there is no failure that might affect both the function and its monitoring, the functions F and F$^{-1}$ must be sufficiently segregated. Specific segregation or "partitioning" mechanisms are thus implemented in the host structure of each computation core in order to prevent a possible corruption from a failure of a first function affecting a second function (in particular the monitoring function). FIG. 3 illustrates the "feedback" control mechanism for a display subsystem conventionally comprising:
 means for acquiring information arriving from a sensor which may be an inertial unit, for example;
 means for processing said parameters, and;
 graphical generation means, the assembly forming a function F for processing the parameters from the sensor.

This subsystem includes a monitoring subsystem which, in parallel, acquires the information coming from the sensor and compares the information with the data deriving from a function $F^{-1}$ which recomputes, from the graphical information, the value of the parameters coming from the sensor.

Consequently, a "client-server" system that can be used, for example, for aeronautical applications, for critical functions must allow:

the display on the "DU"s of critical data sent in the form of commands by an interactive application hosted on a client. The display of engine parameters sent by the appropriate computers will notably be cited;

the use of the interactivity on the "DU"s to check critical functions. As an example, it is desirable for the crew to be able to modify the state of a pump of the fuel management system in a safe manner.

The introduction of the client-server architectures into the critical systems poses the problem of the implementation of the integrity check. The current feedback mechanism covering all of the functional subsystem cannot be made available directly on the server on the one hand and the client on the other hand.

Furthermore, the user interactivity, that is to say the launching of commands by the crew from the graphical interface, is not currently implemented for critical functions or else is implemented using additional means which are highly limiting in terms of human factors. Currently, to avoid these problems, the "client-server" architectures are implemented in non-critical embedded systems.

SUMMARY OF THE INVENTION

The present invention provides a mechanism for securing a client-server system that makes it possible:

to prevent the chance triggering of a function by the user;
to guarantee the integrity of the functions of the server, including the launching of interactive actions by the operator;
to guarantee the consistency of information between the server and the clients.

The securing mechanism is a functional assembly also called "securing engine" implementing a set of mechanisms specific to each family of functions of the server. Thus, the integrity check is based on a computation engine concentrating the checks carried out on a set of mechanisms particular to each server function family:

use of "guards";
use of mathematical "signatures";
implementation of "feedback" on some subfunctions but not on the whole subsystem.

The mathematical signature is a technique initially designed for the monitoring of data transmissions and the detection of computer files. This technique is in this case made available for system dependability purposes. The securing mechanisms according to the invention are made available on the ARINC 661 protocol but this invention can be applied generally to any type of client-server interactive system.

This invention makes it possible to guarantee the integrity of the ARINC 661 server, that is to say guarantee that the critical outputs of the server, that is to say commands in ARINC 661 and plot instructions in any graphical language hereinafter in the text called "XGL" are consistent with its inputs supplied by the input and pointing system and the ARINC 661 commands. It should be noted that the securing engine is a set of functions, of software that is not located on a particular computer.

More specifically, the subject of the invention is a client-server type computer system for graphical applications, that is to say for displaying data in the form of software units called "widgets" on display screens called "display units", each widget being defined by "attributes", said system being intended to control the operation of a machine, the machine comprising at least one human-machine interface allowing interaction with the widgets, said system managing critical data or functions, that is to say data or functions that may lead to a serious malfunction of said machine, the widgets being combined in a structure called "model" comprising the properties of each widget and their hierarchical organization, said model being created from a client-application definition file, the widgets handling the display of the critical functions being called "secured widgets", characterized in that said computer system includes a securing engine including provisions for controlling the display of the secured widgets, the first control provision consisting of the first computation of a "signature" of the model of the secured widgets, of the second computation of a "signature" of the secured widgets' definition file and of the comparison of the two signatures, a signature being a mathematical code associated with the attributes of the secured widgets;

the second control provision consisting of algorithms for checking the conformity of the stack of graphical instructions generated by the server with the model of the secured widgets, said algorithm being of "feedback" type.

Advantageously, the securing engine includes at least one provision for controlling the sending of commands and the input and display of data performed by means of the human-machine interface on the secured widgets, said provision being that the secured widgets are of "UA-validation" type, that is to say that, when a command to change the state of said secured widget is received from the human-machine interface, said secured widget waits for a confirmation message from the "client" before changing state.

Advantageously, the securing engine includes at least:

first provisions for controlling commands and the input and display of data performed by means of the human-machine interface on the secured widgets, said first provisions being that the secured widgets include either guard mechanisms, or dialogue boxes, a guard mechanism being a graphical object protecting the secured widget that must necessarily be unlocked before accessing said secured widget;

second provisions for controlling the input and display of data performed by means of the human-machine interface on the secured widgets, said second provisions ensuring the consistency of the locking of the guard or of the dialogue box with the state of the secured widget;

third provisions for controlling commands and the input and display of data performed by means of the human-machine interface on the secured widgets, said third provisions consisting of the association of signatures of the critical widgets with their guards or confirmation buttons and the verification by the UA of the pairs of signatures via a mapping table;

fourth provisions ensuring the integrity of the value input by the user by the transmission to the UA of the value and of its signature for verification of their consistency by the UA.

Preferably, the machine is an aircraft, the computer system is the onboard avionics of said aircraft and the display screens are cockpit display systems and the computer system operates in accordance with the ARINC 661 aeronautical standard.

BRIEF DESCRIPTION OF THE DRAWINGS

The invention will be better understood and other advantages will emerge from reading the following description given as a nonlimiting example and by virtue of the appended figures in which.

DETAILED DESCRIPTION

Everything that follows relates to a secured client-server computer system for avionics applications operating under ARINC 661. However, the concepts developed in this particular context can easily be transposed to other technical fields that have similar requirements in terms of security of computer exchanges and graphical representations.

Figure 1:
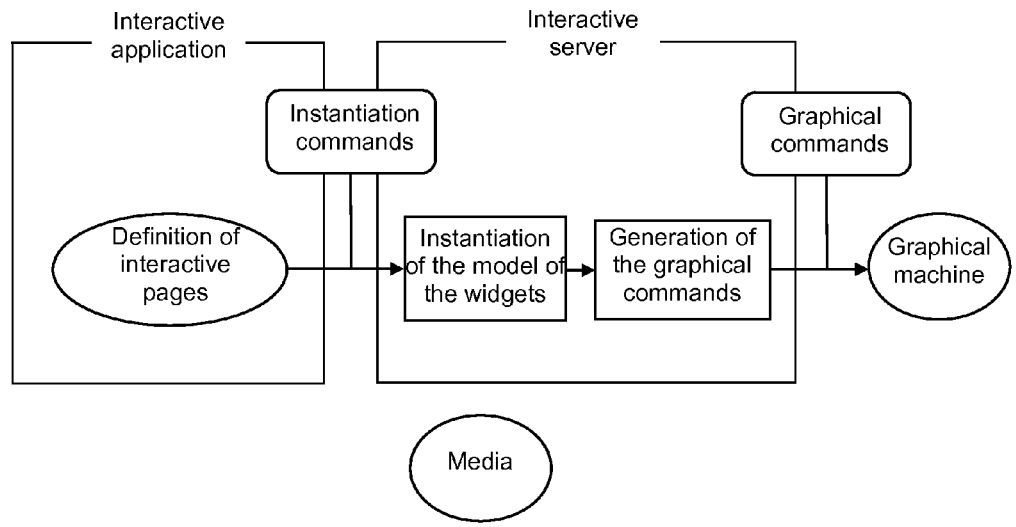
FIGS. 1 and 2 represent two block diagrams, already discussed, of the typical operation of a client-server system according to the prior art, the first block diagram on initialization of the system and the second in routine operation of the system.
Figure 2:
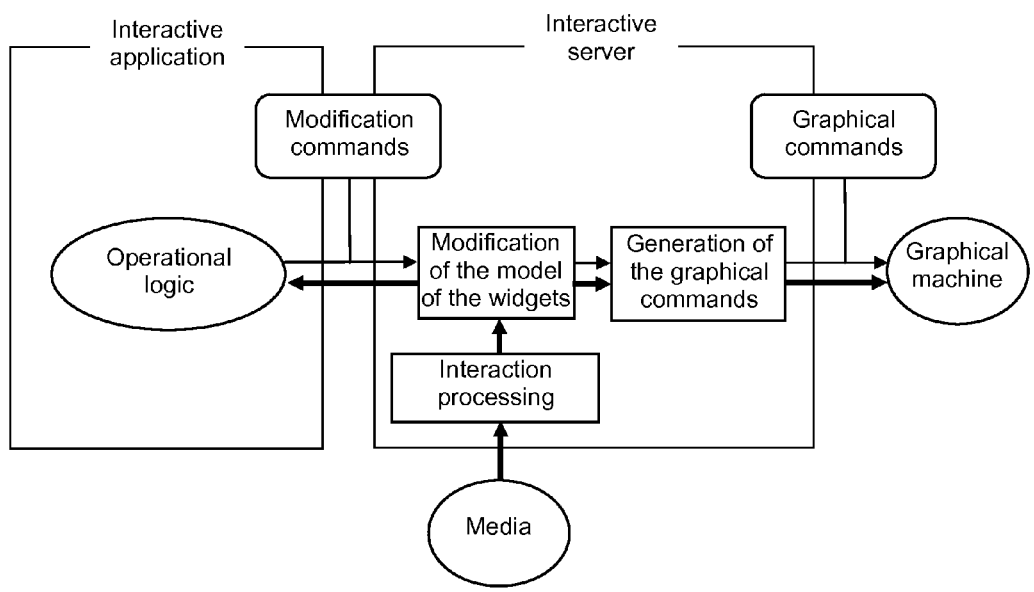
Figure 3:
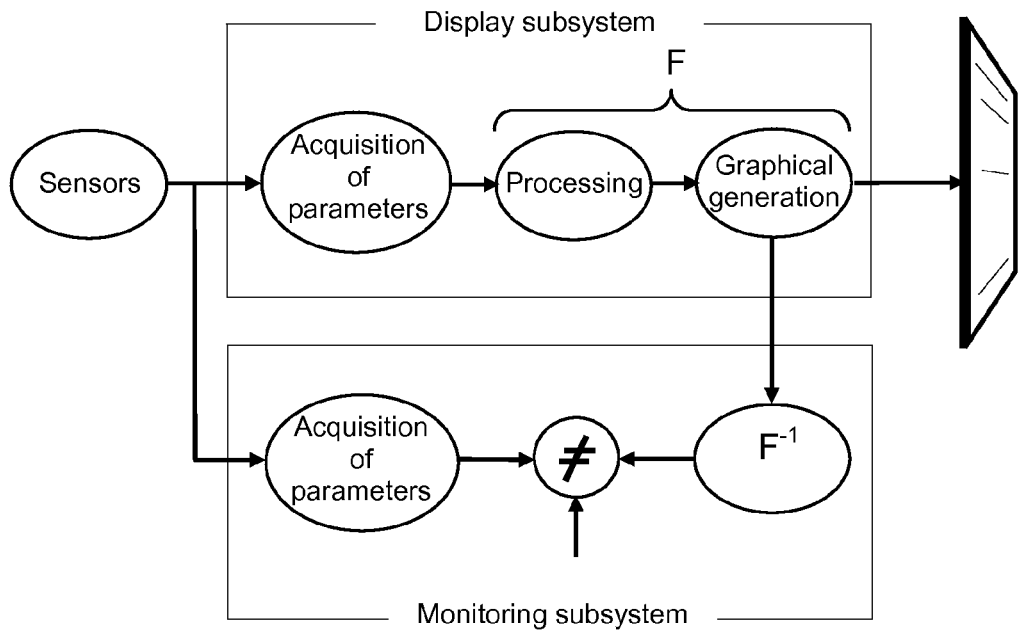
FIG. 3 represents a display subsystem comprising a monitoring subsystem with feedback according to the prior art.
Figure 4:
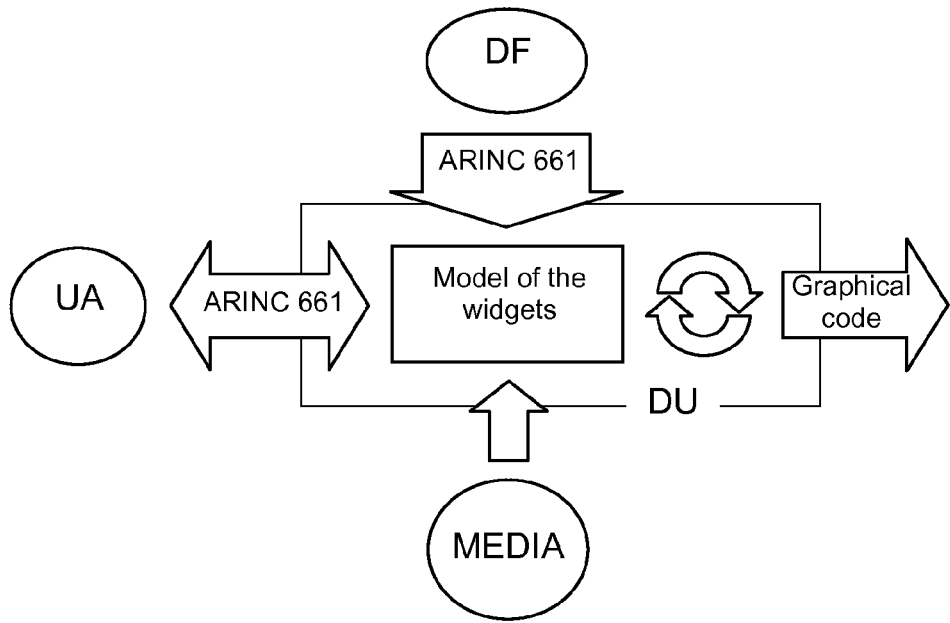
FIG. 4 represents the different data flows in the context of an aeronautical client-server application.

FIG. 4 represents the block diagram of the data exchanges between the various components of the avionics client-server system. The core of the system is the display unit or DU. It displays the widgets from the model of the widgets which is the data structure in memory managed by the ARINC 661 server storing the properties of each widget and the hierarchy between widgets. This model is created from the "user application definition file", or "UADF", more simply called "DF" hereinbelow. The "DU" interacts with the various interaction media controlled by the user and the "UA".

As has been seen, the securing engine must guarantee the integrity of the display of critical data then, secondly, the interactivity on the display units. The following description therefore contains two main sections, the first devoted to the securing of the display, the second to the securing of the interactivity.

Securing of the Display

It is necessary to ensure the securing of the display of a critical datum sent in ARINC 661 by a UA or a DU. An ARINC 661 server manages the display of the widgets on a DU in two steps:

a) management in memory of a data structure called model of the widgets containing the properties of each widget and supporting the parent-child relationships between the different widgets;

b) generation of the so-called XGL graphical instructions by browsing through the data structure.

The securing engine has to cover these two steps.

a) Securing of the Model of the Widgets

Two types of event may modify this model:

a command in A661 sent by a UA;

an event sent by the cockpit avionics called "CDS" (cockpit display system) resulting, for example, in a reconfiguration of the DUs;

With regard to the events sent by the CDS, a distinction is made between reconfigurations deriving from a pilot interaction such as, for example, a page change request by the crew on a DU and those due to a modification of the state of the system such as, for example, the failure of a DU leading to a reconfiguration of the system.

The result of a reconfiguration is the modification of the display of the interactive elements which conditions the dialogues between the UAs and the ARINC 661 server. This modification of the dialogues has an impact of greater or lesser importance on the widgets model. The activation of a new interactive page is an example of externally visible modification which leads to an updating of the model of the widgets, the visibility attributes of all the widgets forming this page being modified.

Securing the model of the widgets therefore amounts to:

managing its integrity with respect to the DF on initialization, then ensuring that the model has not been modified unexpectedly in run time;

finally checking that its changes conform to the ARINC 661 commands received from the UAs and from the CDS events.

At specification time, it is important to correctly identify the widgets to be secured to ensure that this process is applied only to these widgets.

For this securing process, the securing engine uses "signatures", a signature being a mathematical code associated with the attributes of the secured widgets. This code is generally a "Hamming" code. It should be noted that a DF can be seen as a set of ARINC 661 commands and therefore that it is possible to use the same signature method for an ARINC 661 command sent by a UA and a DF file. For these signatures, it is possible to use a function that takes into account:

the type of the command and its A661 code;

the identifiers of the widget;

the value of the command.

For example, on initialization of the DU or on reconfiguration, the consistency engine computes the signature of the DF for the secured widgets and their parents and the signature of the model and verifies that these two signatures match. There are thus:

SignatureDF=f($\Sigma$attributes of the secured widgets of the DF)

SignatureMod=f($\Sigma$attributes of the secured widgets of the model)

In run time, as long as no event modifies the model, the consistency engine cyclically recomputes, at each time interval $\Delta t$, the signature of the model and verifies that SignatureMod at $t+\Delta t$=SignatureMod at $t$.

When the model of the widgets is modified following an ARINC 661 command sent by a UA, the consistency engine retrieves the A661 command from the change of attributes of the model. The following applies:

A661 command=$F^{-1}$ (change of attributes of the model)

It verifies the match with the A661 command received. As a first example, the widget x of page y of "toggle button" type switches from the non-depressed state to the depressed state. The function $F^{-1}$ (change of attributes of the model) makes it possible to retrieve the ARINC 661 command entitled "Depress widget x of page y". As a second example, the "text" attribute of a "text box" widget x2 of page y takes the value "ALPHA", which makes it possible to retrieve the command Set text "ALPHA" widget x2 page y.

It should be noted that the monitoring of the integrity of the widget model, that is to say the computation and the verification of the signatures as described above, must be segregated from the display function.

Thus, the securing of the model of the widgets by the consistency engine is done as follows:
  To prevent the model being inconsistent from the DF:
    comparison of the signature of the DF with the signature of the model on initialization and on reconfiguration.
  To avoid an unexpected modification of the model in the absence of a command:
    comparison of the signature of the model between t and t+Δt in run time;
  To avoid the execution of a command that does not correspond to the command received:
    computation of the ARINC 661 command on modification of the model and comparison with the command received.

b) Securing of the Generation of the Graphical Instructions

This concerns guaranteeing the securing of the display of a critical datum as far as output from the A661 Server, that is to say the generation of the stack of graphical commands in XGL.

The solution according to the invention for securing the generation of the graphical instruction consists in having the consistency engine checked cyclically, for the secured widgets, the conformity of the stack of graphical instructions with the model of the widgets. Such a verification is dependent on the type of widget. As an example, an algorithm for verifying the conformity of the stack of graphical instructions with the model of the widgets for the widgets of "label" type may be:
  For all the secured widgets of "label" type,
    find the "XGLWriteText" command in the stack of graphical instructions corresponding to the widget. For this, a "feedback id" parameter is needed in the XGLWriteText command on the model of the existing function SGL-FeedbackVertex;
    from the XGLWriteText command, move up the stack to the preceding XGLSetAttributes command and compare its parameters with the attributes of the model for the current widget such as, for example, the font and background colours, the font size, etc.,
    verify the conformity of the display coordinates is verified. In the XGL command, the coordinates system may be different from the coordinates system of the model. Therefore, for each secured widget, their coordinates relative to the XGL commands should have been projected beforehand into the model.

An algorithm has to be written on this model for each type of widget that is to be secured. Thus, the securing of the generation of the graphical instructions by the consistency engine is done as follows:
  cyclical verification of the consistency of the conformity of the stack of graphical instructions generated (XGL) with the widget model by the addition of "feedback id" type functions in the XGL graphical language.

Securing of the Interactivity

The interactivity on the DUs combines a number of elements which are:
  a) the transitory interaction on a display unit, comprising the displacement of the cursor, the management of the focus, that is to say the selectable widget area or widget, the highlighting of the objects crossed by the cursor, the opening of a "combo-box", the scrolling of a list; etc.
  b) the interaction of the sending of a command by a widget which, for the critical commands, must be secured;
  c) the interaction of the input and display of a datum, which, for critical data, must be secured.

a) Transitory Interaction

The transitory interaction offers an immediate visual feedback to the user who detects a possible malfunction and can use a secondary interaction means if necessary. For example, the non-recognition of the position of the cursor. Furthermore, this type of interaction does not generate the sending of commands or of data to the interactive application. These two arguments make this type of interaction not critical so it does not need to be secured.

b) The Interaction of the Sending of a Command

For the interaction of the sending of a command, the critical widgets are of so-called "UA validation" type. These widgets have the particular feature of waiting for a confirmation message from the client application before changing state. For example, a button with two states (depressed/not depressed) will send, on a cursor click event, a state change request to the UA which drives this function and waits for a confirmation message from the UA before actually changing its state. If the confirmation message does not reach the widget within a defined time, it reverts to its initial state. This mechanism guarantees the consistency between the state of the HMI and the state of the UA if it is possible to guarantee the processing of a critical datum between a UA and a DU, this point having been discussed in the preceding section.

This "UA validation" mechanism is necessary but not sufficient. It does not prevent an unexpected triggering of a widget either by a bug, or by user error. To overcome this last problem, any critical command is secured either by a guard mechanism, or by a confirmation dialogue box. A guard mechanism is a graphical object protecting a secured widget that necessarily has to be unlocked before accessing said secured widget.

The guard or the confirmation button then has to be guaranteed. To ensure this function, the securing engine sends the UA, via the guard or confirmation button, a signature computed by a function f applied, for example, to the identifier of the widget or any other characteristic unique at the moment when the guard is raised or the confirmation button clicked. The same procedure is applied to the interaction of the widget associated with the critical function. A signature computed by the same function f is sent, after having raised the guard or before the display of the confirmation button. The UA then decodes the two signatures and checks their consistency relative to one another in a table associating the identifiers of the critical widgets with their respective guards or confirmation buttons. The management of the button and that of its guard must also be segregated.

Figure 5:
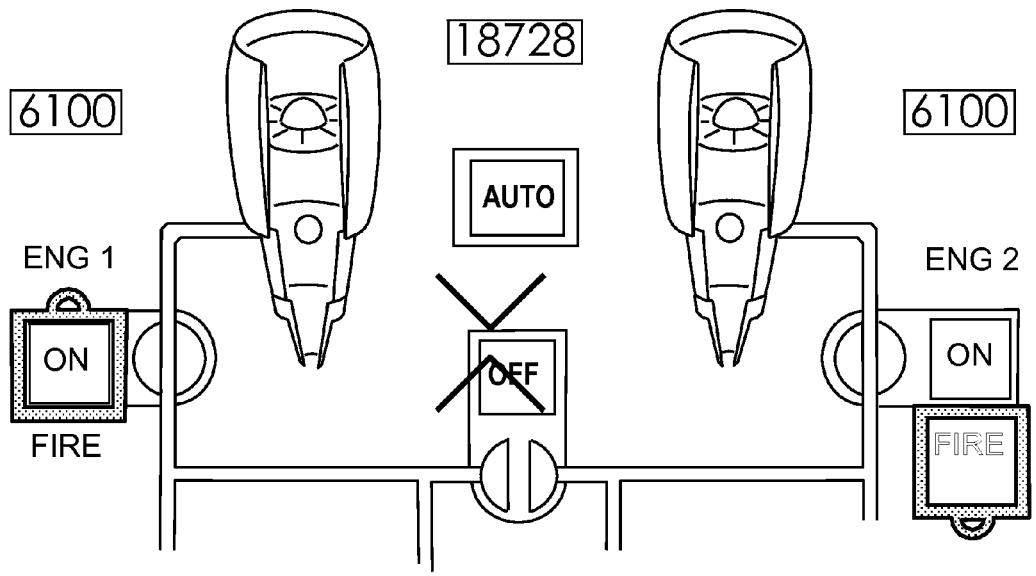
FIG. 5 is a part of a graphical representation of guard buttons in the locked and unlocked positions in the context of the display of the engine control circuits.

As an example, FIG. 5 is a part of the graphical representation of guard buttons in the locked and unlocked positions in the context of the display of the engine control circuits. This figure shows the two jet engines of the craft in the centre of the figure, their fuel supply circuits, level indications "6100" and two command buttons denoted "ENG1" and "ENG2", making it possible to switch the jet engines on or off. It will be clearly understood that these buttons are fundamental to the correct operation of the craft. These two buttons are secured by means of guards represented by shaded rectangles in FIG. 5. In the locked position, the guard covers the button as can be seen on the left in FIG. 5. In the unlocked position, the guard is in a lowered position and no longer covers the button, as can be seen on the right in FIG. 5. To lock or unlock, the user brings the pointer represented by the two bold Vs forming an X in FIG. 5 over the chosen guard, then clicks on it.

Thus, to secure the interaction of the sending of a critical command in ARINC 661 from a DU to a UA, the securing engine simultaneously implements the following three means:

To avoid the untimely triggering of a widget on the HMI due to a human error;
  systematic use of a guard mechanism or of a dialogue box on the same DU managed by segregated software;
  association of signatures of the critical widgets with their guards or confirmation buttons and verification by the UA of the pairs of signatures via a mapping table;
  automatic repositioning of the guard on the button if necessary (after an interaction, after a defined duration, etc.);
To avoid the absence of consistency between the HMI and the UA, that is to say that commands are not taken into account and are not executed by the UA:
  use of "UA validation" widgets only.

Thus, the problem consisting in securing the interaction of the sending of a critical command amounts to guaranteeing the consistency of the display of the widgets relative to the state of the UA.

c) Interaction of Input and Display of a Datum

In the case of input interaction, the current implementation of ARINC 661 for aeronautical applications proposes a "UA validation" family of widgets. The value input into a widget of "edit box" type or selected in a widget of "combo box" type is verified by the UA then returned to the DU for final display. The use of such widgets guarantees the consistency between the UA and the DU if the transfer of a critical datum between a UA and a DU can be guaranteed, this problem already having been dealt with.

It is possible to be content with this mechanism and count on the user to verify that the value input is indeed the value taken into account by the UA. However, it is safer to use the securing engine according to the invention to put in place a signature system on the value input or selected from the DU according to the type of widget concerned (edit box or combo box) to the UA. The UA then verifies the consistency of the signature with the value input or selected before validating and sending the confirmed value to the DU. The computation of the signature of the value must be done as close as possible to the input and in a segregated software layer. A number of solutions can be envisaged such as, for example, an "intelligent" keyboard of KCCU (keyboard cursor control unit) type, capable of storing the result of an input and computing the signature thereof or else the transmission of a signature "key by key" to reconstruct the input on the DU and verify the consistency.

Finally, it is preferable to make systematic use of a guard mechanism to protect access to the input widgets or else a confirmation dialogue box, managed in both cases by a segregated software layer, in order to prevent any accidental input. This guard or this dialogue box must obey the consistency engine control mechanism with the input widget already described above.

Thus, to secure the interaction of input or selection of a critical value in ARINC 661 from a DU to a UA by the simultaneous use of the following four means:
To avoid the untimely sending of a value by the HMI and to avoid, after input, the sending of an incorrect value
  systematic use of a guard button mechanism or a dialogue box on the same DU but managed by a segregated software layer;
  management by the securing engine of an association of signatures with the critical values input or selected and verification by the UA of the consistency of the signature and of the value;
  management by the securing engine of the consistency of the guard or dialogue box with the input widget by the UA.
To guarantee, by the consistency between the human-machine interface and the UA such as, for example, the confirmation that the value input has been taken into account:
  use of "UA validation" widgets only.

Figure 6:
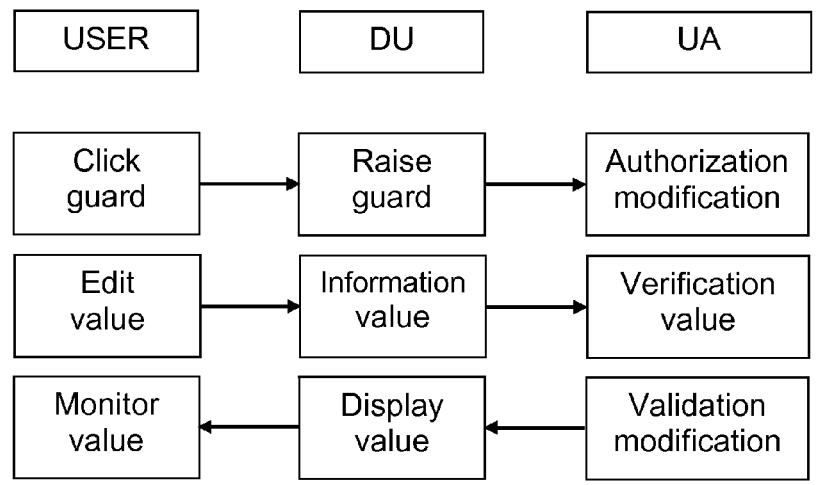
FIGS. 6, 7 and 8 represent the principles of operation according to the invention of the guard mechanism or of dialogue boxes in the case of the sending of secured commands.
Figure 7:
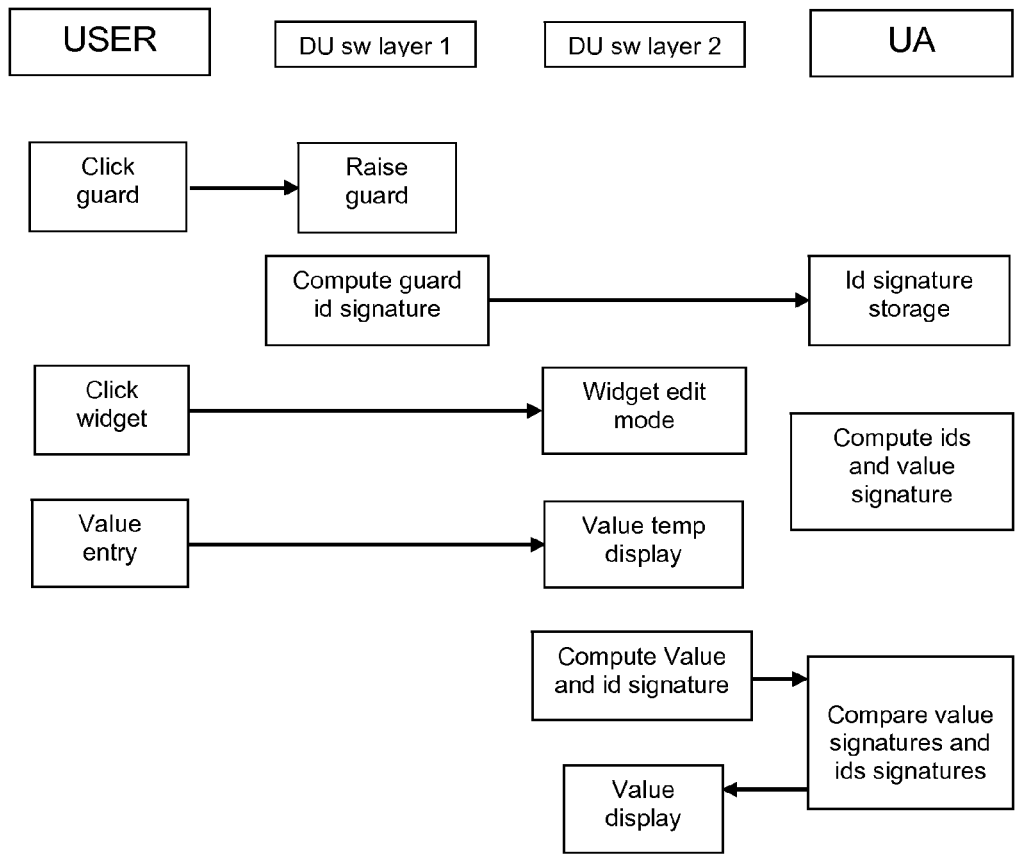
Figure 8:
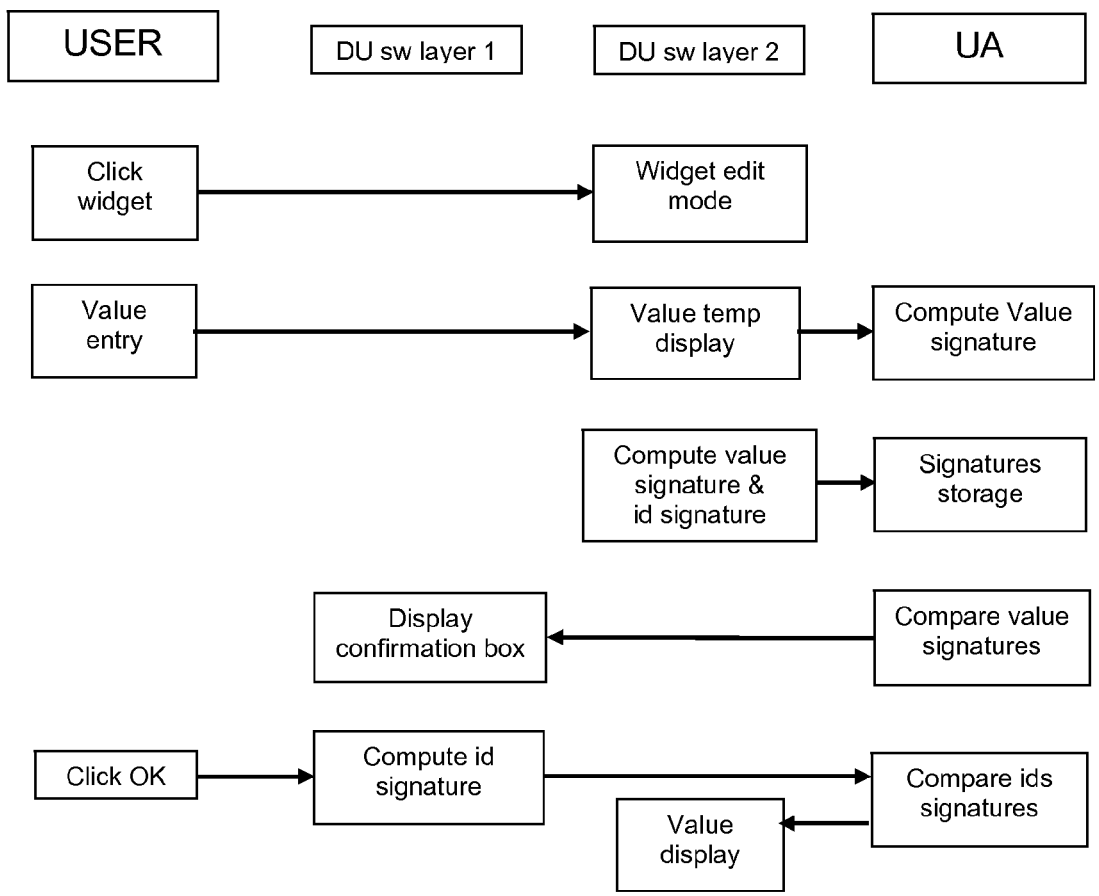

This principle is represented in FIGS. 6, 7 and 8 which represent the sequence diagrams for use of guard buttons or dialogue boxes in the case of the sending of secured commands. FIG. 6 represents the general principle of a sequence diagram for an input with guard and FIGS. 7 and 8 represent this same diagram according to whether it is a guarded button or a confirmation dialogue box.

FIG. 6 is organized in three columns, the first contains the tasks performed by the "USER", the second the tasks performed by the "DU", the third the tasks performed by the "UA". The lines of tasks are grouped together in logical order, the arrows indicating the direction of the actions, the lines of tasks following one another in chronological order. Thus, the user handles three tasks, the first "Click guard" consists in unlocking the chosen guard, the second "Edit value" consists in entering the chosen value, the third "Monitor value" finally consists in validating the chosen value. The DU transmits the information received and the UA handles the securing of the operations.

FIGS. 7 and 8 are organized in four columns, the first contains the tasks performed by the "USER", the second and the third the tasks performed by two segregated software layers belonging to the "DU" and denoted "DU SW layer 1" and "DU SW layer 2", the fourth the tasks performed by the "UA". The lines of tasks are grouped together as previously in logical order, the arrows indicating the direction of the actions, the lines of tasks following one another in chronological order. The user, as in the case of FIG. 6, handles the unlocking, selection and validation tasks.

The table below summarizes the various actions of the "securing engine" according to the invention distributed between the DU and the UA and according to the different processing phases of the ARINC 661 server.

| PHASE | Display Unit (DU) | User Application (UA) |
|---|---|---|
| INITIALIZATION | DF vs model comparison | |
| OPERATING CYCLE | Comparison of model signatures between T and T + ΔT Verification of consistency between critical XGL command and objects of the model | |
| UA COMMAND | Feedback on modification of the model | |
| USER COMMAND | Computation of guard signature Computation of widget signature | Verification of consistency of the signatures |
| USER INPUT | Computation of guard signature Computation of widget signature Computation of value signature | Verification of consistency of the signatures Verification of consistency of the signatures |

The invention claimed is:

1. A client-server type computer system for graphical applications, for displaying data in a form of software units called "widgets" on display screens called "display units", each widget being defined by "attributes", said system comprising: a client being called "user application", said system being intended to control an operation of a machine, the machine comprising at least one human-machine interface allowing interaction with the widgets, said system managing critical data or functions, including data or functions that may lead to a serious malfunction of said machine, the widgets being combined in a structure called a "model" comprising properties of each widget and their hierarchical organization, said model being created from a client-application definition file, the widgets handling display of critical functions being called "secured widgets", a securing engine including provisions for controlling the display of the secured widgets, a first control provision comprising first computation of a "signature" of the model of the secured widgets, second computation of a "signature" of the secured widgets' definition file and comparison of the two signatures, a signature comprises a mathematical code associated with attributes of the secured widgets, the attributes comprising a type of a command and the attributes further comprising an A661 code, identifiers of the widget, or a value of the command; and a second control provision comprising of algorithms for checking conformity of a stack of graphical instructions generated by a server with the model of the secured widgets, said algorithm being a "feedback" type algorithm.

2. The client-server type computer system according to claim 1, wherein the securing engine includes at least one provision for controlling a sending of commands and inputs from a user performed by means of the human-machine interface on the secured widgets, said provision being that the secured widgets are of a "UA-validation" type, wherein, when a command to change a state of said secured widget is received from the human-machine interface, said secured widget waits for a confirmation message from the client before changing state.

3. The client-server type computer system according to claim 1, wherein the securing engine includes at least first provisions for controlling commands and the input and display of data performed by means of the human-machine interface on the secured widgets, said first provisions being that the secured widgets include either guard mechanisms, or dialogue boxes, a guard mechanism being a graphical object protecting the secured widget that must necessarily be unlocked before accessing said secured widget.

4. The client-server type computer system according to claim 3, wherein the securing engine includes at least second provisions for controlling the input and display of data performed by means of the human-machine interface on the secured widgets, said second provisions ensuring the consistency of the locking of the guard or of the dialogue box with the state of the secured widget.

5. The client-server type computer system according to claim 3, wherein the securing engine includes at least third provisions for controlling commands and the input and display of data performed by means of the human-machine interface on the secured widgets, said third provisions consisting of the association of signatures of the critical widgets with their guards or confirmation buttons and the verification by the client of the pairs of signatures via a mapping table.

6. The client-server type computer system according to claim 3, wherein the securing engine includes at least fourth provisions for controlling the input and display of data performed by means of the human-machine interface on the secured widgets, said fourth provisions ensuring the integrity of the value input by the user by the transmission to the client of the value and of its signature for verification of their consistency by the client.

7. The client-server type computer system according to claim 1, wherein the machine is an aircraft, the computer system is the onboard avionics of said aircraft and the display screens are cockpit display systems and the computer system works according to the ARINC 661 aeronautical standard.

* * * * *